(12) United States Patent
Wang et al.

(10) Patent No.: US 6,337,044 B1
(45) Date of Patent: Jan. 8, 2002

(54) MOLDING PROCESS FOR MANUFACTURING A MOLDED ARTICLE

(75) Inventors: Ming-Cheng Wang, Taipei Hsien; Yeou-Ching Lee, Taipei, both of (TW)

(73) Assignees: Chin Chun Hsing Decoration Inc., Samchung; Alvin Lee Jewelry Inc., Taipei, both of (TW)

( * ) Notice: Subject to any disclaimer, the term of this patent is extended or adjusted under 35 U.S.C. 154(b) by 0 days.

(21) Appl. No.: 09/680,295

(22) Filed: Oct. 6, 2000

(51) Int. Cl.⁷ .......................... B29C 39/26; B29C 39/36
(52) U.S. Cl. ........................ 264/313; 164/132; 264/334
(58) Field of Search .............................. 264/271.1, 278, 264/219, 334, 313; 164/132

(56) References Cited

U.S. PATENT DOCUMENTS

| | | | | |
|---|---|---|---|---|
| 3,233,310 A | * | 2/1966 | Corl .......................... 264/278 |
| 3,825,647 A | * | 7/1974 | Kirsch ........................ 264/277 |
| 4,003,778 A | * | 1/1977 | Phillips ...................... 264/313 |
| 4,093,175 A | * | 6/1978 | Putzer et al. ................ 264/313 |
| 4,352,772 A | * | 10/1982 | Bezner ....................... 264/275 |
| 4,436,690 A | * | 3/1984 | Davis ......................... 264/313 |
| 4,919,608 A | * | 4/1990 | Catalanotti et al. ......... 264/313 |
| 4,948,541 A | * | 8/1990 | Beck ........................... 264/275 |

* cited by examiner

Primary Examiner—Allan R. Kuhns
(74) Attorney, Agent, or Firm—Jacobson Holman, PLLC

(57) ABSTRACT

A molding process for manufacturing a molded article includes the steps of placing a flexible tube in a mold cavity, introducing a molding raw material into the mold cavity around the tube to form a molded part that encloses a portion of the tube, removing the molded part together with the tube from the mold cavity, and withdrawing the tube from the molded part to form a channel in the molded part.

8 Claims, 7 Drawing Sheets

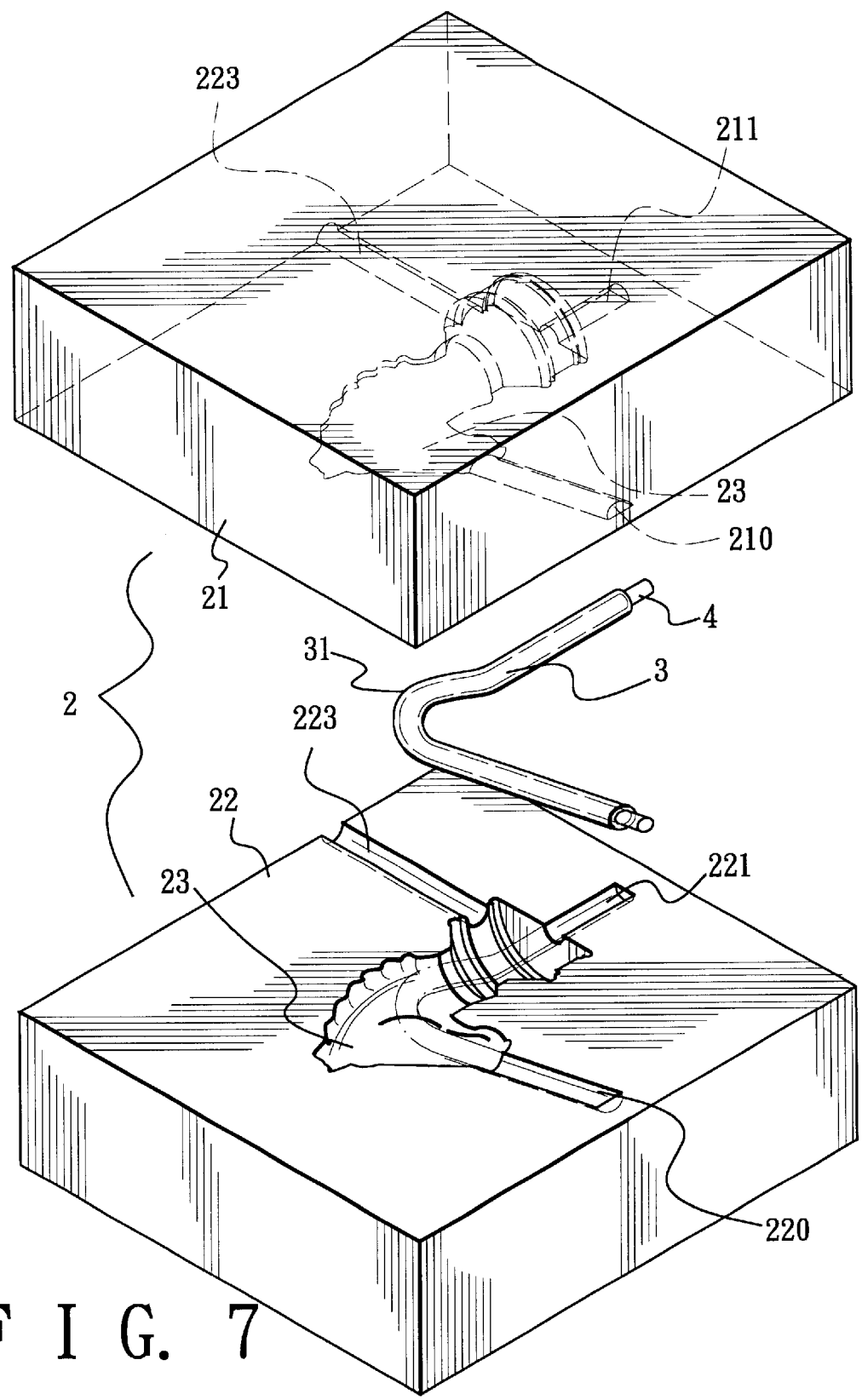
F I G. 7

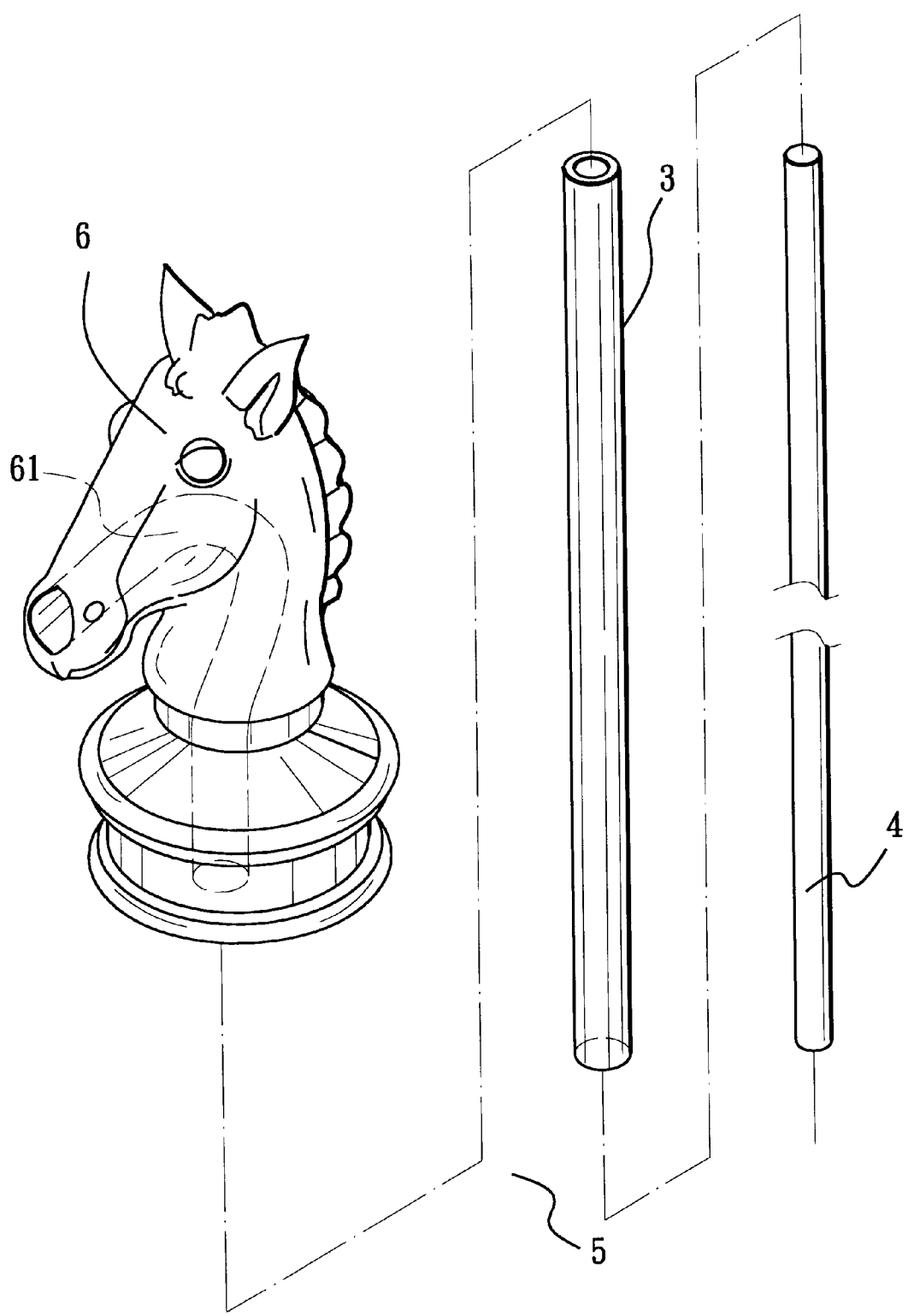
F I G. 8

MOLDING PROCESS FOR MANUFACTURING A MOLDED ARTICLE

BACKGROUND OF THE INVENTION

1. Field of the Invention

This invention relates to a molding process for manufacturing a molded article, more particularly to a molding process for manufacturing a molded article formed with a channel.

2. Description of the Related Art

Molded articles for decoration, souvenir, stationery and the like are normally provided with channels for various purposes. FIG. 1 illustrates a letter opener 1 including a blade 11 and a handle 2 with a channel 10 for insertion of the blade 11. FIGS. 2 to 4 illustrate how a channel 132 is formed in a molded decoration 14 made of a metal. The decoration 14 is prepared by molding the metal in a mold 12 which includes upper and lower mold halves 120, 121 confining a mold cavity therebetween. Two pairs of opposite positioning grooves 122 are respectively formed in confronting surfaces of the upper and lower mold halves 120, 121 at two opposite sides of the mold cavity, and are communicates with the mold cavity. To form the channel 132 in the decoration 14, a rigid hollow rod 13 is placed in the mold cavity with two opposite ends being placed and positioned in the grooves 122. Metal in a melted state is then introduced into the mold cavity and is molded over the rod 13 to form a molded part. The two opposite ends of the rod 13 that protrude outwardly from the thus formed molded part are subsequently cut off (see FIG. 3) or the rod 13 is completely withdrawn from the thus formed molded part to form the channel 132 in the decoration 14 (see FIG. 4). When the rod 13 is to be withdrawn from the molded part in the process of forming the channel 132, the rod 13 can be solid instead of being hollow.

The manufacture of the decoration 14 is disadvantageous in that since a portion of the rod 13 remains in the decoration 14 and since the protruding portions of the rod 13 are cut off and will become waste, the manufacturing cost will be increased and disposal of the waste will be troublesome. Moreover, since the rod 13 is tightly surrounded by the molded part, it is difficult to withdraw the same from the molded part. There is thus a tendency for the molded part and/or the rod 13 to be damaged during the withdrawing action.

The mold 12 described above can only produce a channel having a simple shape, and requires the grooves 122 to be formed in the confronting surfaces of the upper and lower mold halves 120, 121. When a channel (indicated as reference number 133' in FIG. 6) having a complex shape, such as a curved shape or a bent shape, is to be formed in a molded part 14', or when a plurality of channels 132, 132', 133, 133' extending in different directions are to be formed in molded parts 14', 14" (see FIGS. 5 and 6), a multi-piece mold (i.e. more than two pieces) is required for manufacturing the molded part. As such, the manufacture of the molded part becomes very complex and costly. While the channel 132, 133 in the molded part 14' can be formed by drilling, the drilling process is time consuming and can result in an enormous increase in production cost. Furthermore, it is impossible to form the channel 133' of the mold part 14" by drilling. In an alternative method, the channels 132, 132', 133, 133" in the molded parts 14', 14" are formed by separating the molded parts into different pieces. At least two mold pieces are needed to combine with each other by welding or gluing to form each of channels 132, 132' 133, 133'. However, the welding process or the gluing process is also time consuming, and there is a tendency for the mold parts 14', 14" to break at locations where the welding or the gluing is applied. Moreover, when two channels in two pieces are connected to form a channel in the assembled piece, and when the channel is to be used for storing liquid, there is a tendency for the liquid to leak at locations where the welding or the gluing is applied.

SUMMARY OF THE INVENTION

Therefore, the object of the present invention is to provide a molding process for manufacturing a molded article that is capable of overcoming the aforementioned drawbacks.

According to the present invention, a molding process for manufacturing a molded article comprises the steps of: (a) preparing a mold having a mold cavity that has a shape conforming to that of the molded article, and a positioning groove disposed externally of and in communication with the mold cavity; (b) preparing a flexible tube; (c) placing the tube in the mold cavity and positioning one end of the tube in the positioning groove; (d) closing the mold and introducing a molding raw material into the mold cavity around the tube to form a molded part that encloses a portion of the tube; (e) removing the molded part together with the tube from the mold cavity; and (f) withdrawing the tube from the molded part to form a channel in the molded part.

BRIEF DESCRIPTION OF THE DRAWING

In the following drawings which illustrate an embodiment of the invention,

FIG. 7 illustrates a mold and a molded article molded in the mold by a molding process embodying this invention;

FIG. 8 illustrates how a bent channel in the molded article of FIG. 7 is formed;

DETAILED DESCRIPTION OF THE PREFERRED EMBODIMENT

Figure 1:
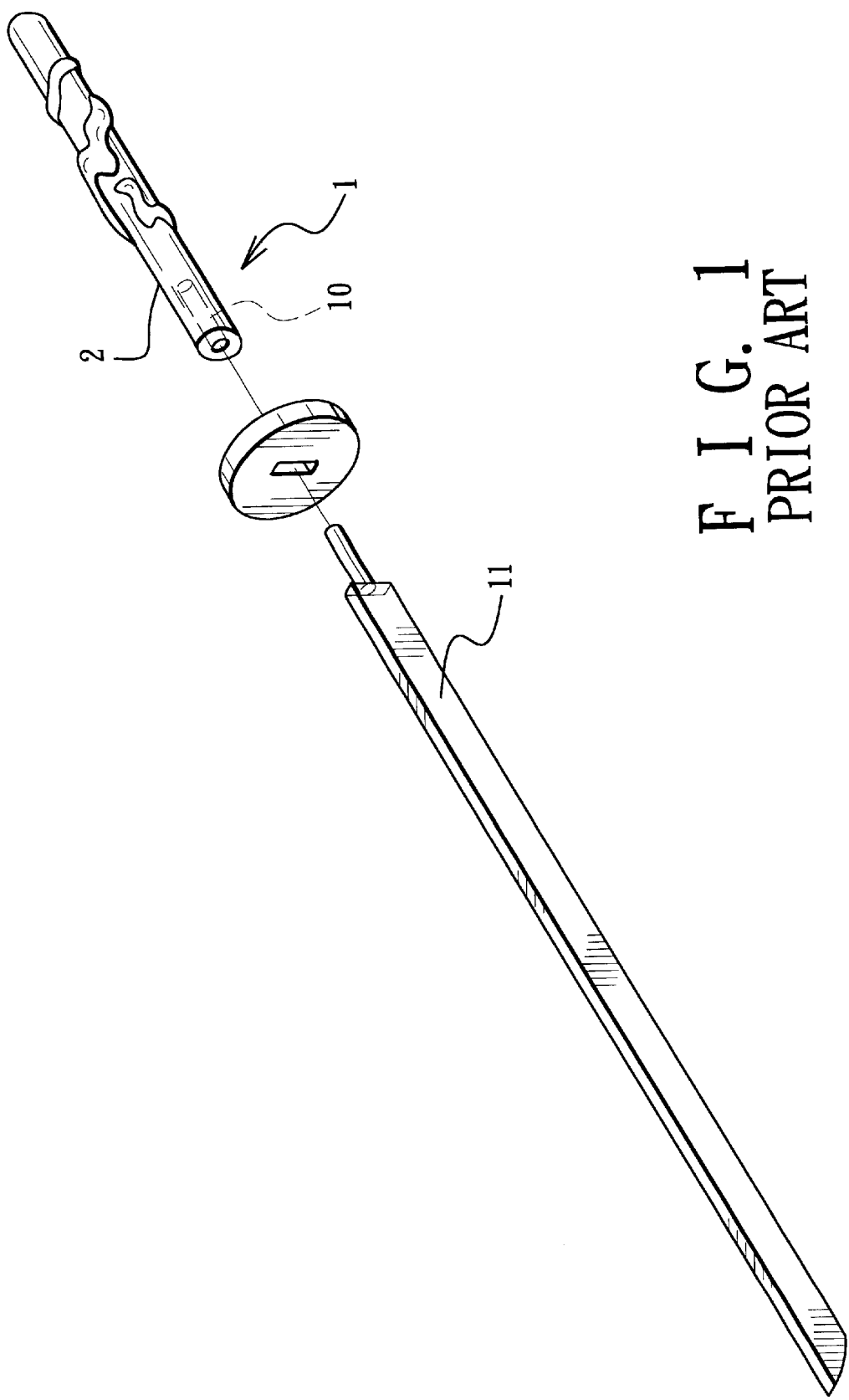
FIG. 1 is an exploded perspective view of a letter opener including a handle provided with a channel.
Figure 2:
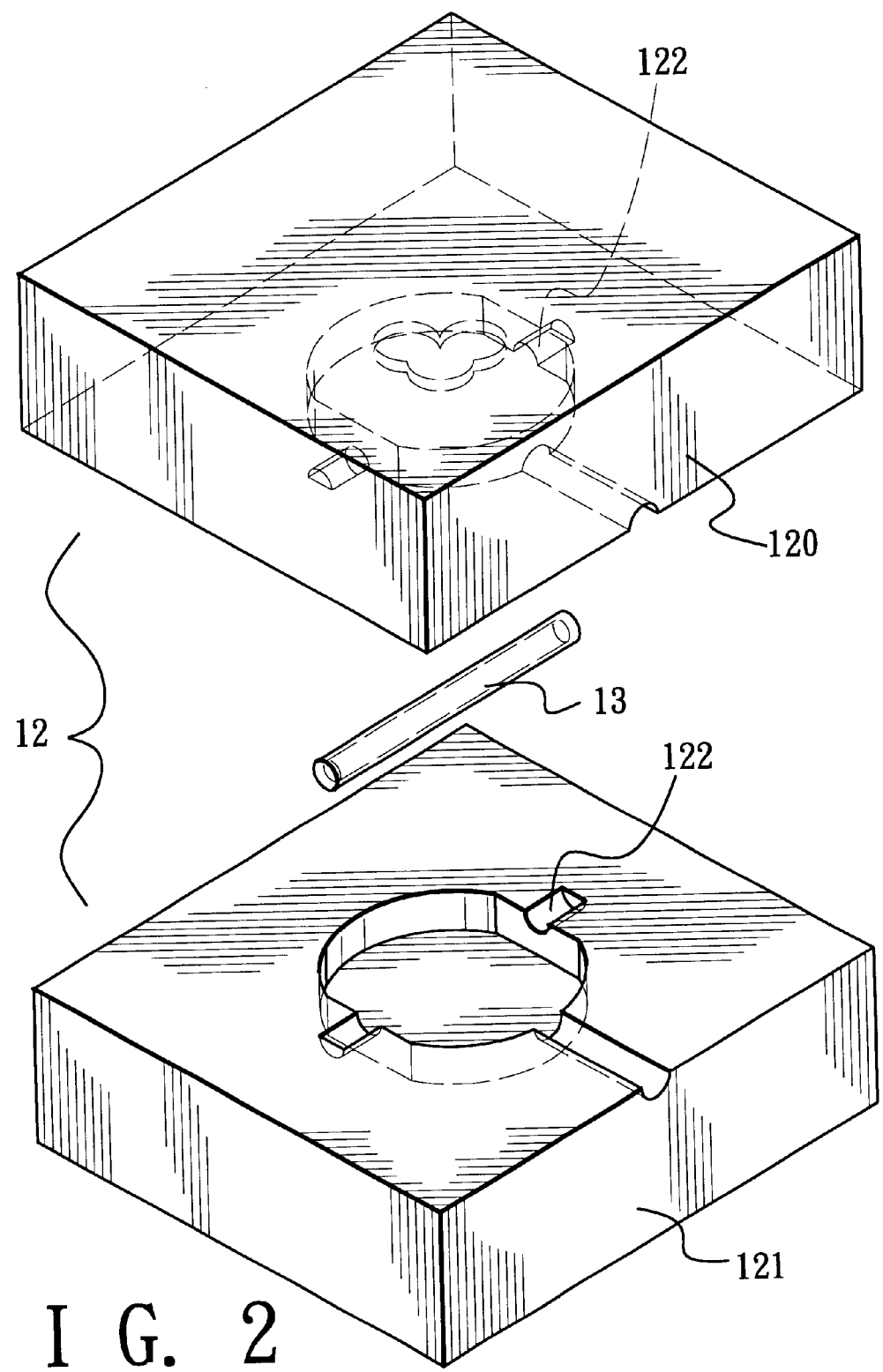
FIG. 2 illustrates how a decoration with a channel is prepared in a mold by a conventional molding process.
Figure 3:
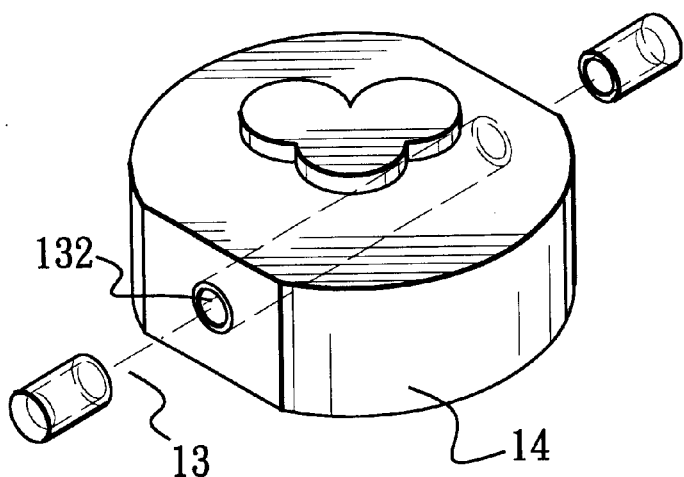
FIGS. 3 and 4 illustrate different ways of how the channel is formed in the decoration.
Figure 4:
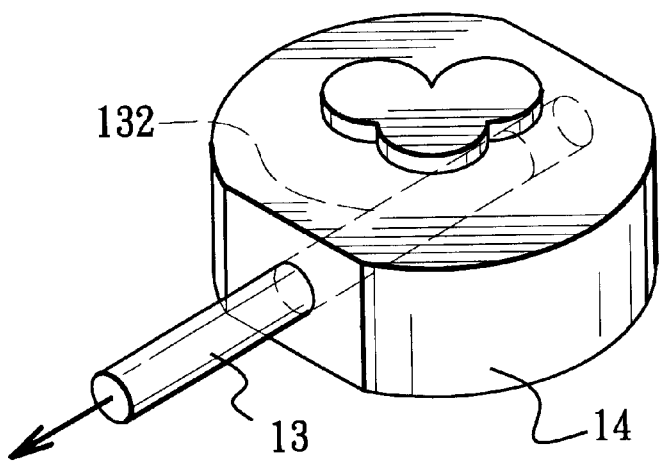
Figure 5:
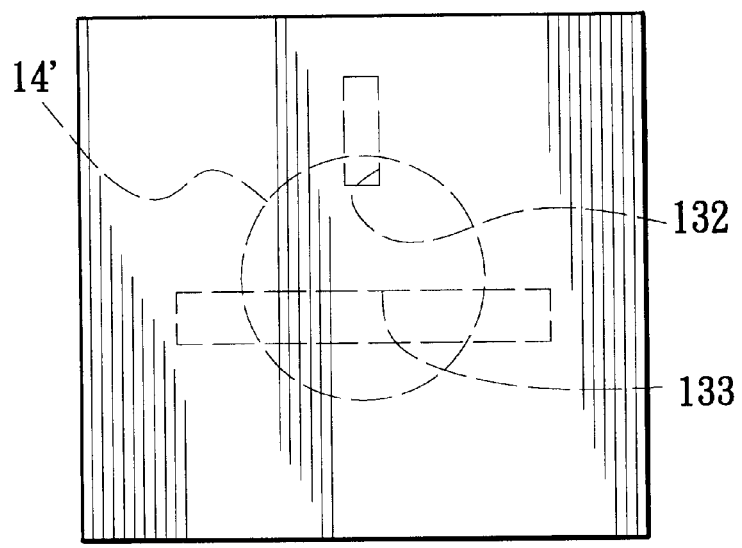
FIGS. 5 and 6 respectively illustrate decorations provided with different channels.
Figure 6:
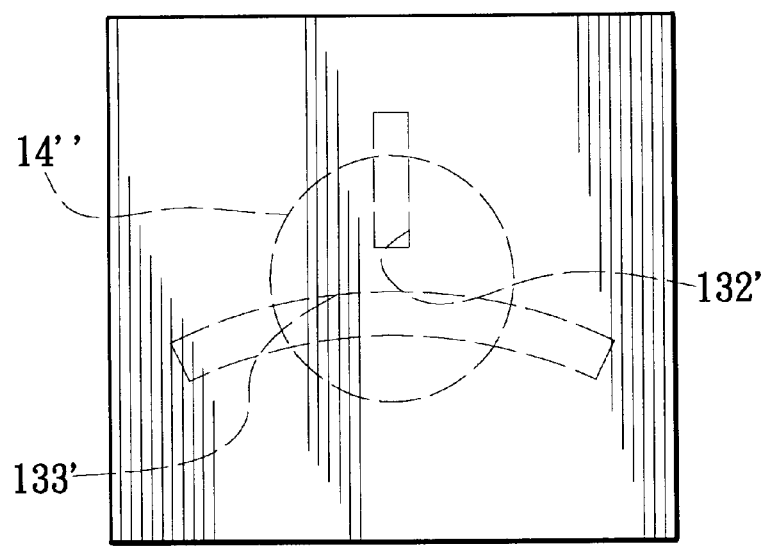

FIGS. 7 and 8 illustrate a molded article 6 prepared by a molding process embodying this invention. The molded article 6 has a channel 61 formed therein.

The molding process includes the steps of: (a) preparing a mold 2 which includes upper and lower mold halves 21, 22 that confine a mold cavity 23 having a shape conforming to that of the molded article 6, a pair of upper positioning grooves 210, 211 formed in a bottom face of the upper mold half 21, a pair of lower positioning grooves 220, 221 formed in a top face of the lower mold half 22 and respectively complementing with the upper positioning grooves 210, 211, and a runner having complementary runner halves 223 formed respectively in the upper and lower mold halves 21, 22, the upper and lower positioning grooves 210, 211, 220, 221 being disposed externally of and in communication with the mold cavity 23; (b) preparing a flexible tube 3 having a bent portion 31 and a flexible supporting wire 4 inserted into the tube 3 and extending through the entire tube 3 for supporting the tube 3; (c) placing assembly of the tube 3 and the wire 4 in the mold cavity 23 and positioning two opposite ends of the tube 3 in the upper and lower positioning grooves 210, 211, 220, 221; (d) closing the mold 2 and introducing a molding raw material through the runner and into the mold cavity 23 around the assembly of the tube 3 and the wire 4 to form a molded part that encloses the assembly of the tube 3 and the wire 4 such that the two opposite ends of the tube 3 are exposed from the molded part; (e) removing the molded part together with the assembly of the tube 3 and the wire 4 from the mold cavity 23; and (f) withdrawing the wire 4 from the tube 3 and subsequently withdrawing the tube 3 from the molded part to form the channel 61 in the molded part.

Since the wire 4 is flexible, it is relatively easy to withdraw the same from the tube 3. In addition, since the tube 3 is also flexible, it becomes easier to withdraw the tube 3 from the molded part once the wire 4 has been removed, thereby eliminating the aforesaid drawbacks as encountered in the prior art.

The molding process of this invention is preferably adopted for manufacturing a molded article made of metal, such as a Pb-Sn alloy (Pewter). As such, the flexible tube 3 employed in the molding process is preferably made of silicone rubber having a melting point higher than that of the material of the molded article, and the flexible wire 4 is made of a metal having a melting point higher than that of the material of the molded article. Since the structure and the property of the tube 3 remain unchanged after the molding process, it can be reused during subsequent molding.

Figure 9:
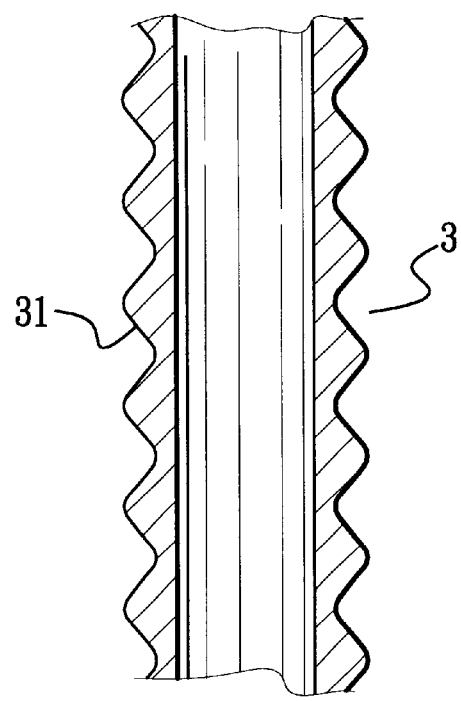
FIG. 9 illustrates a modified flexible tube for forming the bent channel in the molded article of FIG. 7.

As illustrated in FIG. 9, one of the two opposite ends of the flexible tube 3 can have a threaded outer surface 31 so as to form the channel 61 with an inner threaded end.

Figure 10:
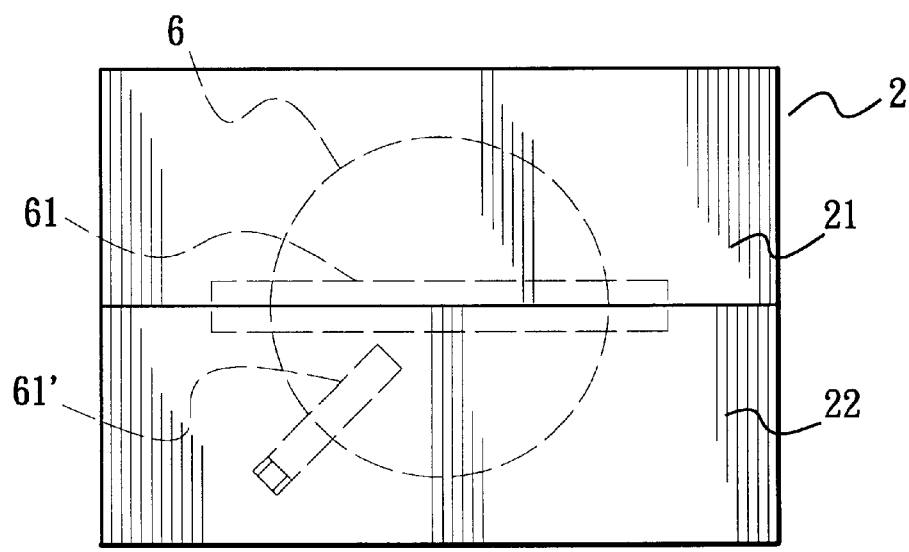
FIG. 10 illustrates another molded article provided with two channels in two directions and prepared by the molding process of this invention.

As illustrated in FIG. 10, since both the tube 3 and the wire 4 are flexible, it is relatively easy to remove a molded article 6, which has channels 61, 61' extending in different planes in the molded article 6, from a two-piece mold 2. It is noted that one channel 61' is formed in the lower mold half 22 and is inclined to a horizontal plane defined by the mating faces of the upper and lower mold halves 21, 22 where the other channel 61 is formed.

With the invention thus explained, it is apparent that various modifications and variations can be made without departing from the spirit of the present invention. It is therefore intended that the invention be limited only as recited in the appended claims.

We claim:

1. A molding process for manufacturing a molded article, comprising the steps of:

preparing a mold having a mold cavity that has a shape conforming to that of the molded article, and a positioning groove disposed externally of and in communication with said mold cavity;

preparing a flexible and reusable tube and a flexible supporting wire;

placing said tube in said mold cavity and positioning one end of said tube in said positioning groove;

inserting said wire into said tube in said mold cavity in a manner that said wire extends into said tube along the length of said tube and is isolated from said mold cavity by said tube;

closing said mold and introducing a molding raw material into said mold cavity around said tube to form a molded part that encloses a portion of said tube;

removing said molded part together with said tube from said mold cavity;

withdrawing said supporting wire from said tube in said molded part; and withdrawing said tube from said molded part to form a channel in said molded part without disintegrating said tube.

2. The molding process of claim 1, wherein said mold includes two mold halves, and said groove being formed in one of said mold halves.

3. The molding process of claim 1, wherein said supporting wire is a metal wire.

4. The molding process of claim 1, wherein said tube is made from silicone rubber.

5. The molding process of claim 1, wherein said flexible tube is bent.

6. The molding process of claim 1, wherein said flexible tube has a bent portion, and said supporting wire extending through said bent portion of said flexible tube.

7. The molding process of claim 1, wherein said molding raw material is a metal material.

8. The molding process of claim 1, wherein said molding raw material is a resin material.

* * * * *